United States Patent
Budhiraja et al.

(10) Patent No.: US 10,803,083 B2
(45) Date of Patent: Oct. 13, 2020

(54) SYSTEM AND METHOD OF GENERATING PLATFORM-AGNOSTIC ABSTRACT SYNTAX TREE

(71) Applicant: Infosys Limited, Bangalore (IN)

(72) Inventors: Navin Budhiraja, Palo Alto, CA (US); Sudipto Shankar Dasgupta, Bangalore (IN); Mayoor Rao, Mangalore (IN)

(73) Assignee: Infosys Limited, Bangalore (IN)

( * ) Notice: Subject to any disclaimer, the term of this patent is extended or adjusted under 35 U.S.C. 154(b) by 425 days.

(21) Appl. No.: 15/247,677

(22) Filed: Aug. 25, 2016

(65) Prior Publication Data

US 2017/0060910 A1     Mar. 2, 2017

(30) Foreign Application Priority Data

Aug. 27, 2015 (IN) .......................... 4511/CHE/2015

(51) Int. Cl.
    *G06F 16/25*     (2019.01)

(52) U.S. Cl.
    CPC .................. *G06F 16/258* (2019.01)

(58) Field of Classification Search
    CPC .................. G06F 17/30569; G06F 16/258
    USPC ............................................... 707/755
    See application file for complete search history.

(56) References Cited

U.S. PATENT DOCUMENTS

| 8,154,964 B2 * | 4/2012 | Fujinami | G11B 27/105 369/275.1 |
| 8,725,750 B1 | 5/2014 | Waye et al. | |
| 2009/0313613 A1 * | 12/2009 | Ben-Artzi | G06F 8/51 717/137 |
| 2013/0031459 A1 * | 1/2013 | Khorashadi | G06F 17/2247 715/234 |
| 2013/0104100 A1 * | 4/2013 | Mueller | G06F 9/44 717/106 |
| 2013/0132932 A1 | 5/2013 | Van Rozen | |
| 2014/0201838 A1 * | 7/2014 | Varsanyi | G06F 21/552 726/23 |
| 2014/0280030 A1 | 9/2014 | Freedman et al. | |
| 2014/0282444 A1 | 9/2014 | Araya et al. | |
| 2016/0092502 A1 * | 3/2016 | Krishnamurthy | G06F 16/24526 707/691 |

OTHER PUBLICATIONS

Armbrust et al., "Spark SQL: Relational Data Processing in Spark," *SIGMOD '15*, May 31-Jun. 4, 2015, Melbourne, Victoria, Australia, 12 pages.

* cited by examiner

*Primary Examiner* — Hosain T Alam
*Assistant Examiner* — Saba Ahmed
(74) *Attorney, Agent, or Firm* — Klarquist Sparkman, LLP

(57) ABSTRACT

A method generating a platform-agnostic abstract syntax tree (AST) comprises receiving data in a predefined format, through an input unit; subsequently parsing the data to extract model information corresponding to the predefined format of the data; and transforming, by a processing server, the model information to an abstract syntax tree (AST) structure. The above steps aid in generating, by the processing server, a platform-agnostic AST by combining predefined metadata and the abstract syntax tree (AST) structure.

19 Claims, 2 Drawing Sheets

(PRIOR-ART)

SYSTEM AND METHOD OF GENERATING PLATFORM-AGNOSTIC ABSTRACT SYNTAX TREE

FIELD

The field relates to abstract syntax trees.

BACKGROUND

The world of query languages is fast evolving and diverse. Each of the query languages have their own processing framework in some cases similar to each other, in other cases completely dissimilar. Some of them follow the SQL paradigm others follow procedural, objected oriented, graphical paradigm to name a few. This adds to the complexity of the interface layer to query languages. Any change to the underlying query language, query paradigm is completely disruptive from the application building point of view.

The user may have a set of queries or a view point around seeking insight from the big data systems spread around various evolving open source technologies—Hadoop, Hive, Map-Reduce, Spark, others. With disruptive technology and information growth, its succinct intelligence to get abstract data structure or table becomes more important to meet the user insight. For example, when existing computer software at a business is being replaced with new computer software, the new computer software may require codes to be written in a different language for a particular query or business rule. Until recently, most of the big data processing was pervasive of map-reduce jobs on Hadoop. Pig Scripts and Hive scripts, which gave, SQL like syntax to express the map-reduce jobs have brought in advancements to simplify the conventional big data programming. Map-reduce jobs are extremely slow on large data-sets and only support batch processing and are not suitable for real time processing. With business teams looking into foresights at rapid pace, it has led to advent of new technologies addressing these specific problems around real time processing and rapid insights such as—Apache Spark, Apache Flink, etc. Conventionally the user requirement remains same—generating insights, the persistent change is with varied options to accomplish the requirement. With open source contributions and community driven efforts, the advancement in technologies is only going to increase which brings to foray of not having a hard wired application around a particular technology but be agnostic to transform and meet the best of technology inventions.

SUMMARY

In a preferred aspect of the present invention there is disclosed a method of generating platform-agnostic abstract syntax tree (AST) comprising of receiving data in a predefined format, through an input unit. Subsequently parsing the data to extract a model information corresponding to the predefined format of the data, by a parser and transforming, by a processing server, the model information to an abstract syntax tree (AST) structure. The above steps aid in generating, by the processing server, a platform-agnostic AST by combining a predefined metadata and the abstract syntax tree (AST) structure.

In another aspect of the invention the model information comprises a set of table names and optionally a join condition and a filter condition.

In yet another aspect of the invention parsing comprises removal of noise data from the input data.

In another aspect of the invention the noise is corrected from the data such that only the information related to tables, selected columns, aggregate function, filter condition and join information is retained. This information constitutes the AST.

In yet another aspect of the invention the processing server is configured to generate a model execution path for enrichment of AST.

In yet another aspect of the invention one AST enrichment parameter is selected from the predefined metadata.

In a further aspect of the invention the AST is enriched with at least a location information, a storage type of the data and a schema definition.

In further another aspect of the invention the enriched AST is parsed, through a parser, to obtain an interim data model and passed to a transformation engine.

In an additional aspect of the invention the transformation engine, upon receiving the parsed AST selects a transformer corresponding to a target execution engine to generate the platform-agnostic AST.

In another preferred aspect of the invention there is disclosed a system of template creation for a data extraction tool comprising one or more processors and one or more memories operatively coupled to at least one of the one or more processors and having instructions stored thereon that, when executed by at least one of the one or more processors, cause at least one of the one or more processors to receive, through an input unit, data in a predefined format. Subsequent to receiving of the data, it is parsed by a parser to extract a model information corresponding to the predefined format of the data and transforming, by a processing server, the model information to an abstract syntax tree (AST) structure. The above aids in generating, by the processing server, a platform-agnostic AST by combining a predefined metadata and the abstract syntax tree (AST) structure.

In another aspect of the invention the input unit comprises a Graphical User modeler configured to define relations between at least two underlying tables.

In yet another aspect of the invention the processing server is configured to generate a model execution path for enrichment of AST.

In further another aspect of the invention at least one AST enrichment parameter is selected from the predefined metadata comprising at least a location information, a storage type of the data and a schema definition.

In another aspect of the invention the predefined metadata and the enriched AST are stored in the metastore. The metastore is a traditional repository for storage of data.

In yet another aspect of the invention the parser is configured to parse the enriched AST to obtain an interim data model and pass the interim data model to a transformation engine.

In another aspect of the invention the transformation engine, upon receiving the parsed AST selects a transformer corresponding to a target execution engine to generate the platform-agnostic AST.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

Figure 1:
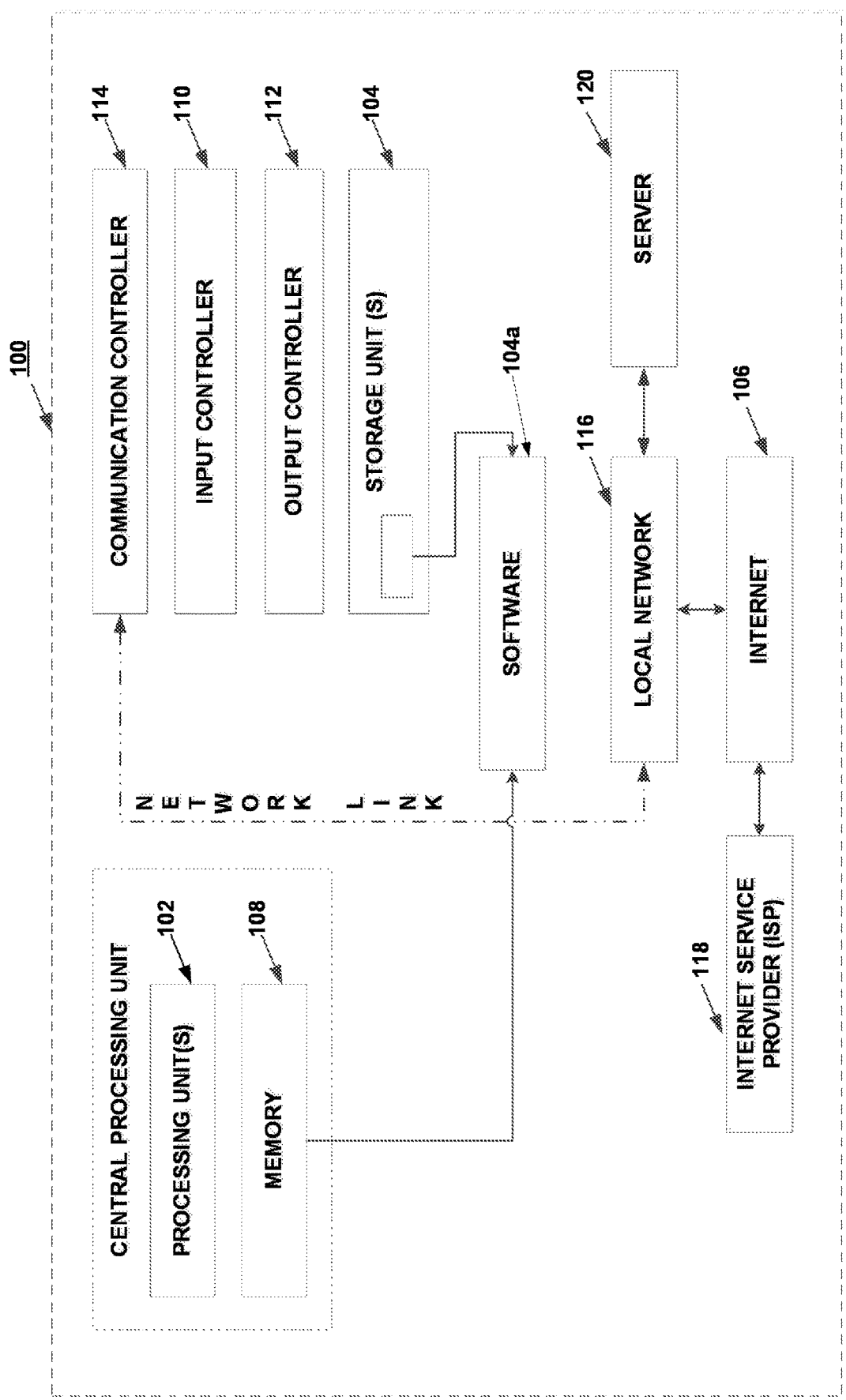
FIG. 1 illustrates a system in which various embodiments of the invention may be practiced.

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The method steps have been represented, wherever appropriate, by conventional symbols in the drawings, showing only those specific details that are pertinent to understanding the embodiments of the present invention so as not to obscure the disclosure with details that will be readily apparent to those of ordinary skill in the art having benefit of the description herein.

The features of the present invention are set forth with particularity in the appended claims. The invention itself, together with further features and attended advantages, will become apparent from consideration of the following detailed description, taken in conjunction with the accompanying drawings.

Big data may be characterized as a large data set. For example, greater than a terabyte of data, a petabyte of data, or any suitable size. The storage system is preferably hosted on a distributed cloud storage system such as Amazon's S3/EC2, Microsoft Azure or Rackspace Managed Hosting. It may alternatively be any suitable infrastructure including a traditional storage system. The data is preferably kept in a compressed format. The remote distributed storage system preferably functions to store data for both real-time querying and for large batch data querying, but may alternatively partition and group data in any suitable way. Such environments run the likes of Hadoop, NoSQL and Cassandra as analytics engines, and typically have PCIe flash storage alone in the server or in addition to disk to cut storage latency to a minimum.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Figure 2:
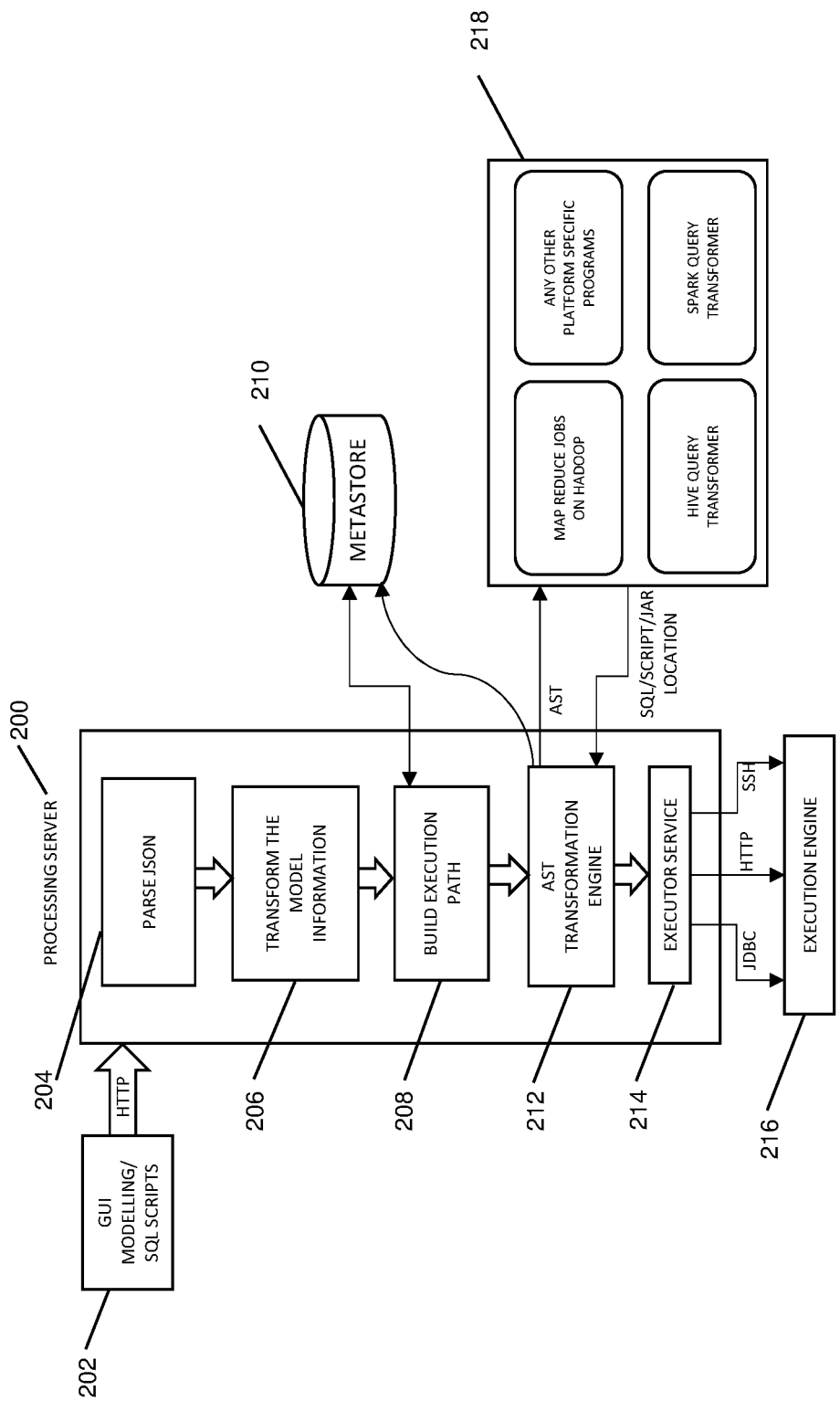
FIG. 2 illustrates a preferred embodiment of process flow of the invention.

Describing one of the preferred embodiments, as represented by FIG. 2, the invention requires registering input of data through an Input unit as described above. The input may be provided directly onto the computing system or over a network.

In one embodiment, a system is provided for administration of a Hadoop distributed computing network. The system may alternatively comprise any other Big Data computing network. The system comprises a Hadoop cluster including at least one name node computer and a plurality of data node computers. The system further includes an administration computer comprising a processor and computer readable memory having stored thereon computer executable instructions for implementing a Big Data adapter configured to receive user input and convert the user input into computer executable instructions for data processing and data manipulation on a distributed file system. The graphical user interface comprises an inventory module configured to receive the user input for administrating the data in the distributed file system, correlating the data on the distributed file system, a configuration module configured to communicate the computer executable instructions for administering the organization of the data and the processing of the data using pluggable data processing engine through a medium which is agnostic to the data processing engine.

In another embodiment the input unit (202) comprises a Graphical User modeler configured to define relations between at least two underlying tables. The model may be defined using the graphic modeler using an SQL statement. The user chooses the mode of defining the model based on his/her familiarity and comfort level with SQL or GUI. The SQL Query Interface can be used to script any ANSI SQL query.

In a preferred embodiment, the input may be provided in multiple formats like, but not limited to. JSON or SQL query construct. This source code of an input is usually a data model definition which may be represented in any format by a client application.

In one exemplifying embodiment of the invention, this input data is further passed over an internet protocol like, but not limited to, HTTP or HTTPS to a processing layer to parse (204) the predefined format and extract a model information. The data parsing is carried out to extract the model information. The processing layer creates an Abstract Syntax Tree from the input received, by first removing the noise from the user input. The Model as developed through the GUI based modeler or SQL Query scripted through the query interface, is converted to a JSON abstract syntax tree. The user input may contain information which are relevant to the rendering of the graphical model, which is not required for processing of the data. This information is treated as noise data by the processing server and filtered out.

In another embodiment of the invention, the transformation of the data model by the processing server occurs in a manner that the transformation assists in the functioning of a program or an application supporting the execution of big data processing programs or queries. In an exemplifying scenario this may be established when authoring an application or when verifying the correctness of the code and running the application intended outcome. The transformation is performed by the processing server wherein the noise data is filtered out from the input data such that only the tables, selected columns, aggregate function, filter condition and join information is retained. This retained information constitutes the AST structure. At this point, there is no information about the location of the data. The location of data is required for loading the data into the memory for processing and analysis. All the relevant information such as file type, location and scheme definition has to be added to the AST. For all further use, such an AST would be referred to as enriched AST and the process of adding all the above information will be referred as enrichment of the AST. This information is stored in a structured data store referred herein-after as metastore. The metastore also stores additional information about Raw data vs logical table name mapping, Schema details of the raw data, Data format (delimited, parquet, hive table, etc.), Model details (Original AST, Enriched AST, Transformed output). The meta-store communicates in an asynchronous manner with the processing server to store back the enriched AST. The Metadata of the data stored in the system is cataloged and maintained in the metastore. The actual data may be stored in different formats in a distributed files system. The meta-store, contains a pointer to the physical location of the data and the corresponding schema information. The meta-store may also contain other qualifying information such as file type, size, etc.

In one of the embodiments of the invention the processing server is configured to generate a model execution path (208) for enrichment of AST. In this phase, the generated AST stricture is populated with details required for locating and reading the data. A sample set of information that is added to the AST are, but not being limited to, Location information, Storage type of the data and Schema definition.

In an exemplifying embodiment of the present invention, the enriched AST thus obtained is parsed through a parser and converted to a java object mode. The parser may be configured to convert the enriched AST to any relevant language other than that described above.

In another embodiment of the present invention, once the AST is converted to a suitable object model, the parsed AST is passed as input to the transformation engine (212). The transformation engine (212) is configured to select the transformer associated with a target execution engine and pass the parsed AST as input to the transformer program. In an exemplifying embodiment, the transformer may be selected from, but not limited to map reduce jobs on Hadoop. Hive Query Transformer, Spark Query Transformer or Any Other Platform Specific Programs. The target execution engine is selected from the metastore where it is stored in a preconfigured state. The set of transformers to be selected by the processing engine may be further predefined by the user. The system also allows for dynamically selecting a transformer in a plugin format wherein the system is scalable. The transformation engine instantiates a specific transformer based on the knowledge of the target execution engine. The enriched AST is then passed as input to the specific transformer.

The output of the transformer may be in any format as may be desired by the target execution engine. The output may be in the format of, but not limited to, an SQL query, a jar file or a script file.

The transformation engine (212) invokes an executor service (214) to generate a platform specific query or program to be executed by an execution engine (216). The system provides a predefined Application Programming Interface which can be used to implement a platform specific logic. The system looks up the configured execution engine and looks up for the API implementation for the configured execution engine. The API definition provides a mechanism to plug any implementation of the processing engine. The transfer of instruction from the executor service to the execution engine is done through a suitable protocol depending on the expected platform specific result. Exemplifying protocols, but not limited to, may be HHTP, SSH, JDBC etc.

In a further embodiment of the present invention, a system for generating platform-agnostic abstract syntax tree (AST) is disclosed. The system comprises a processor and a memory operatively coupled to the processor and has instructions stored thereon that, when executed by the processor cause the processor to execute specific functions. The functions include receiving, through an input unit, data in a predefined format and subsequently parse the data, by a parser, to extract a model information corresponding to the predefined format of the data. Further to the above a processing is configured to transform the model information (206) to an abstract syntax tree (AST) structure. The system also comprises a processing server top generate a platform-agnostic AST by combining a predefined metadata and the abstract syntax tree (AST) structure.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A method, implemented through a computing system, of generating a platform-agnostic abstract syntax tree (AST) comprising:
   receiving, through an input unit, user input data in a predefined format;
   parsing the user input data, by a first parser, to extract at least one model information corresponding to the predefined format of the user input data;
   transforming, by a processing server, the at least one model information to a transformed abstract syntax tree (AST) structure which is free of metadata;
   generating, by the processing server, a platform-agnostic AST by adding a predefined metadata, a file type, and a schema definition to the transformed AST structure that is free of metadata, wherein the predefined metadata, the file type, and the schema definition are retrieved from a metastore which is separate from the processing server;
   parsing the platform-agnostic AST, through a second parser, to obtain an interim data model;
   selecting, by a transformation engine, a transformer corresponding to a target execution engine and passing the interim data model to the transformer; and
   generating, by the transformer, a platform-specific query to be executed by the target execution engine;
   wherein the predefined metadata comprises location information, wherein the location information comprises a pointer to data to be loaded into a memory of the computing system for processing and analysis by the processing server.

2. The method as claimed in claim 1, wherein the at least one model information comprises of at least a set of table names.

3. The method as claimed in claim 1, wherein a transformation engine is configured to filter a noise data from the user input data to retain relevant information constituting the transformed AST structure, wherein the noise data comprises information which is relevant to rendering the transformed AST structure.

4. The method as claimed in claim 1, wherein the processing server is configured to generate a model execution path for enrichment of the transformed AST structure by adding at least one AST enrichment parameter to the transformed AST structure.

5. The method as claimed in claim 4, wherein the at least one AST enrichment parameter is selected from the predefined metadata.

6. A system of template creation for a data extraction tool comprising:
   one or more processors; and
   one or more memories operatively coupled to at least one of the one or more processors and having instructions stored thereon that, when executed by at least one of the one or more processors, cause at least one of the one or more processors to:
   receive, through an input unit, user input data in a predefined format;
   parse the user input data, by a first parser, to extract at least one model information corresponding to the predefined format of the user input data;
   transform, by a processing server, the at least one model information to a transformed abstract syntax tree (AST) structure which is free of metadata, wherein only tables, selected columns, aggregate function, filter condition, and join information are retained in the transformed AST structure;
   generate, by the processing server, a platform-agnostic AST by adding a predefined metadata, a file type, and a schema definition to the transformed AST structure that is free of metadata, wherein the predefined metadata, the file type, and the schema definition are retrieved from a metastore which is separate from the processing server;
   parse the platform-agnostic AST, through a second parser, to obtain an interim data model;
   select, by a transformation engine, a transformer corresponding to a target execution engine and pass the interim data model to the transformer; and
   generate, by the transformer, a platform-specific query to be executed by the target execution engine;
   wherein the predefined metadata comprises location information, wherein the location information comprises a pointer to data to be loaded into a memory of a computing system for processing and analysis by the processing server.

7. The system as claimed in claim 6, wherein the input unit comprises a Graphical User modeler configured to define relations between at least two underlying tables.

8. The system as claimed in claim 6, wherein a transformation engine is configured to filter a noise data from the user input data to retain relevant information constituting the transformed AST structure, wherein the noise data comprises information which is relevant to rendering the transformed AST structure.

9. The system as claimed in claim 6, wherein the processing server is configured to generate a model execution path for enrichment of the transformed AST structure and generate an enriched AST structure by adding at least one AST enrichment parameter to the transformed AST structure.

10. The system as claimed in claim 9, wherein the enriched AST structure is stored in the metastore.

11. One or more non-transitory computer-readable media comprising computer-executable instructions that cause a computing system to perform a method of generating a platform-agnostic abstract syntax tree (AST) comprising:
   receiving, through an input unit, user input data comprising a query construct;
   parsing the user input data to extract at least one model information corresponding to the query construct of the user input data;
   transforming the at least one model information to a transformed abstract syntax tree (AST) structure which is free of metadata, wherein only tables, selected columns, aggregate function, filter condition, and join information are retained in the transformed AST structure;
   generating an enriched, platform-agnostic AST by adding a predefined metadata, a file type, and a schema definition to the transformed AST structure that is free of metadata, wherein the predefined metadata, the file type, and the schema definition are retrieved from a metastore which is separate from a processing server;
   generating an interim data model by parsing the enriched, platform-agnostic AST;
   selecting a transformer corresponding to a target execution engine and passing the interim data model to the transformer; and
   generating a platform-specific query to be executed by the target execution engine;

wherein the transformer comprises a map reduce job on Hadoop, a Hive query transformer, or a Spark query transformer.

12. The one or more non-transitory computer-readable media as claimed in claim 11,
wherein the predefined metadata comprises location information, wherein the location information comprises a pointer to data to be loaded into a memory of the computing system for processing and analysis by the processing server.

13. The system as claimed in claim 6 wherein the system supports a transformer for map reduce jobs on Hadoop, a transformer for Hive queries, and a transformer for Spark queries.

14. The method as claimed in claim 1,
wherein the transformation engine supports a map reduce job on Hadoop transformer, a Hive query transformer, and a Spark query transformer.

15. The method as claimed in claim 1, wherein the predefined format comprises an SQL query construct.

16. The method as claimed in claim 1, wherein the target execution engine is selected from the metastore where it is stored in a preconfigured state.

17. The system as claimed in claim 6, wherein the predefined format comprises an SQL query construct.

18. The system as claimed in claim 6, wherein the target execution engine is selected from the metastore where it is stored in a preconfigured state.

19. The one or more non-transitory computer-readable media as claimed in claim 11, wherein the target execution engine is selected from the metastore where it is stored in a preconfigured state.

\* \* \* \* \*